A. D. SANTMIRE
BABY CARRIAGE.
APPLICATION FILED SEPT. 18, 1916.
1,228,055.
Patented May 29, 1917.
2 SHEETS—SHEET 1.
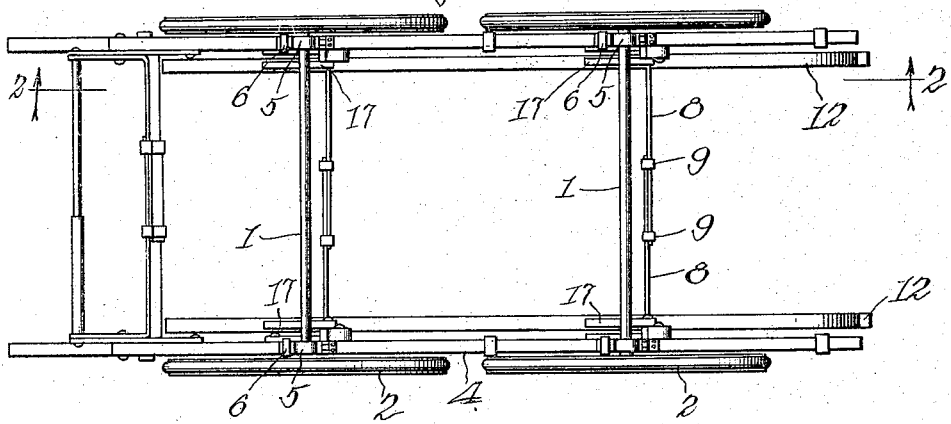
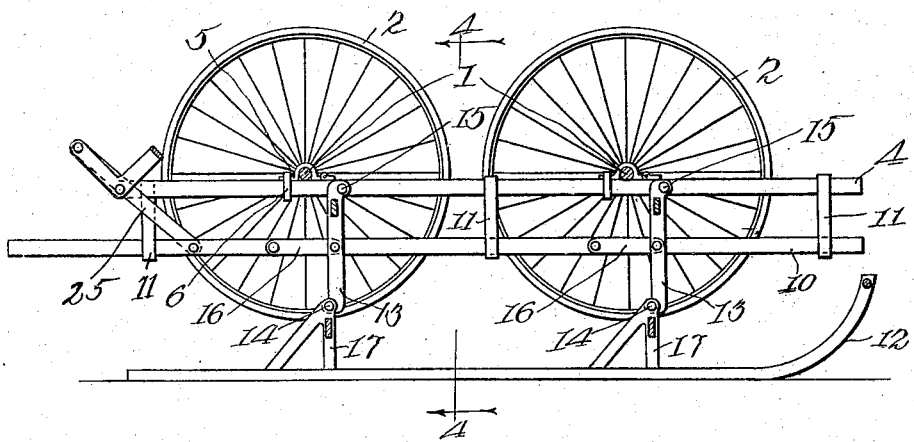
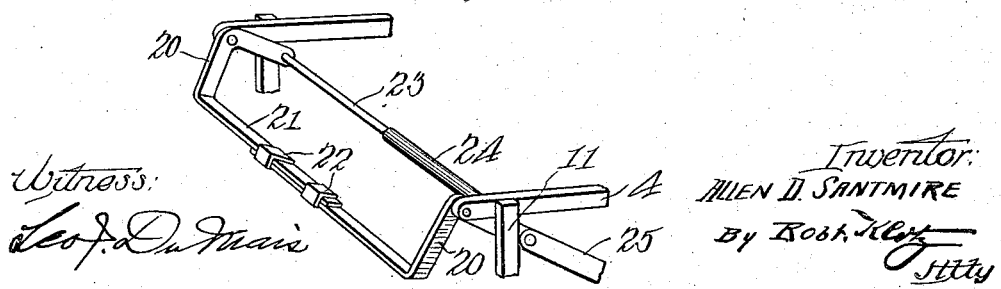

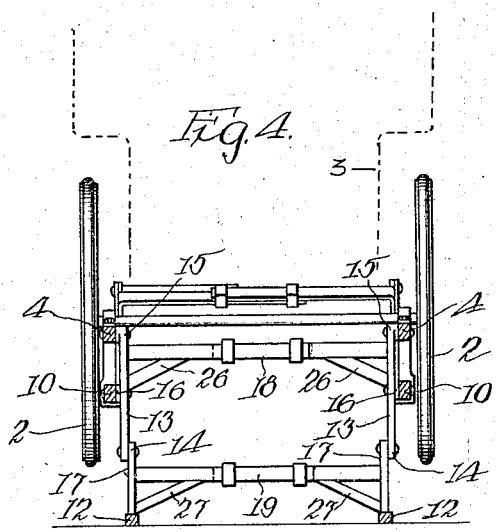
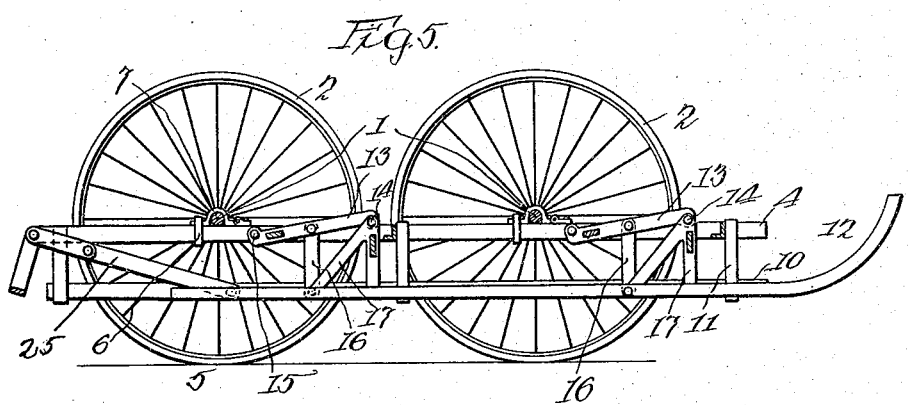
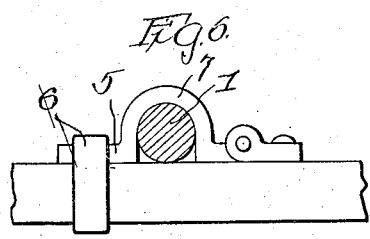

UNITED STATES PATENT OFFICE.

ALLEN D. SANTMIRE, OF CHICAGO, ILLINOIS.

BABY-CARRIAGE.

1,228,055.   Specification of Letters Patent.   Patented May 29, 1917.

Application filed September 18, 1916. Serial No. 120,858.

*To all whom it may concern:*

Be it known that I, ALLEN D. SANTMIRE, a citizen of the United States, residing at Chicago, in the county of Cook and State of Illinois, have invented certain new and useful Improvements in Baby-Carriages, of which the following is a specification.

My invention relates to improvements in sled attachments for vehicles and more particularly to attachments of this character which are adapted to be secured to a baby carriage or the like.

To make vehicles such as baby carriages serviceable all the year around in climes in which a portion of the year is cold and wintery, it is advisable to provide means for converting the vehicles into sleighs during the winter months.

My present improvement is designed for this purpose and is made complete in itself so that it may be removably attached to any conventional type of baby carriage or other vehicle, thus converting it into a combination baby carriage and sleigh.

The objects of my invention are to provide a simple, cheap and durable sled attachment for vehicles which is so constructed that it can be easily and quickly fastened to or removed from the vehicle and which when so attached can be lowered to convert the vehicle into a sleigh or raised to permit the vehicle to travel upon its supporting wheels.

These and other objects I accomplish as hereinafter set forth in the following description and as particularly pointed out in the appended claims, reference being had to the accompanying drawings in which my improved sled attachment is shown in connection with a baby carriage of conventional form.

In the drawings

Figure 1, represents a top plan of a baby carriage equipped with my improved sled attachment.

Fig. 2, is a vertical section of the carriage with the runners lowered to convert it into a sleigh taken on line 2—2 of Fig. 1.

Fig. 3, is an enlarged fragmentary view of the angular foot lever for operating the sled attachment.

Fig. 4 is a vertical section of the carriage taken on line 4—4 of Fig. 2.

Fig. 5, is a side elevation with the runners raised and the carriage supported upon its wheels.

Fig. 6, is an enlarged detail view to illustrate the way in which the sled attachment is detachably secured to the carriage.

In referring to the embodiment of my improved sled attachment for vehicles shown in accompanying drawings in detail like numerals designate like parts.

As shown, my improved sled attachment is detachably secured to a baby carriage of any well known type in which 1, represents the axles of the carriage, 2 the supporting wheels, and 3 the body.

My improved attachment is hung or suspended from the axles of the carriage in such a manner that it may be turned down into a supporting position with the sleigh runners beneath the wheels or up into a non-supporting position with the runners above the tread of the wheels and out of contact with the ground.

As shown the attachment has an upper frame consisting of two longitudinal side members or bars 4, which are secured to the carriage axles 1, by clamping blocks 5, which are pivoted at one end to the bars 4, and detachably locked thereto at the opposite end by rings 6, as shown in Fig. 6.

Each of the clamping blocks 5 is provided with a curved and raised intermediate portion 7, which fits around the axle.

The frame members or bars 4, are joined by extensible connections each composed of two transverse bars 8, which extend inwardly from the link rods of the respective frame members and lap each other being slidably fastened to each other by encircling bands 9, as shown in Fig. 1.

A longitudinal slide bar 10, is supported beneath each frame member or bar 4, being slidably mounted at the lower extremities of vertical bars 11, hung pendant at intervals from the frame member.

Sleigh runners 12 are secured to the frame members 4, by link rods 13, which are each pivoted at one extremity 14 to the runner, at the opposite extremity 15 to the frame member 4 and at an intermediate point to one end of a link 16 the opposite end of which is pivoted to the slide bar.

The lower extremity of each of the link rods is preferably connected to an inverted V-shaped brace 17, extending up from the sleigh runner instead of directly to the runner itself as shown in Figs. 2 and 5.

The two slide bars 10, are connected together by transverse extensible bars 18, similar to the bars 8, previously described and the sleigh runners are likewise joined together by extensible transverse connecting bars 19.

The slide bars 10, are moved longitudinally to raise or lower the sleigh runners by an angular lever which can be conveniently operated by the foot or by hand if desired.

The construction of this lever is perhaps best shown in Fig. 3, from which it will be noted that it is formed in two corresponding halves or parts, each of which has a V-shaped end portion 20, and a transverse portion 21, which extends inwardly from one end of the V-shaped end part.

The transverse portions are lapped and are slidably secured to each other by encircling bands 22, so that the lever is extensible transversely with the frame slide bars and runners.

In fact the entire attachment is adjustable in a cross or transverse direction in order that the distance between its runners may be widened or narrowed to enable the device to be suitably attached to carriages of varying length of axles.

The ends of the V-shaped portions opposite the transverse portions 21 are also preferably connected to each other to stiffen the construction.

As shown, a bar 23 extends from one portion which telescopes in a tube 24 extending from the transversely opposite portion of the other half of the lever.

Each of the slide bars is connected to one end of the V-shaped portion of the lever in longitudinal alinement with said bar by a pivotal link 25.

When the runners are in their supporting position as shown in Fig. 2, they may be quickly raised by turning the angular lever which, operating through the links 25, forces the slide bars forwardly turns the link rods 13 from the vertical position shown in Fig. 2 to the nearly horizontal position shown in Fig. 5, and elevates the runners to about the same horizontal plane as the slide bars.

As the lever is turned past the center in both raising and lowering the runners and describes the greater part of a circle, the runners are automatically maintained in both positions without the aid of other supports or locks.

The transverse connecting bars are preferably braced and strengthened by diagonal braces 26 and 27.

My improved attachment while particularly adapted for baby carriages and other small light hand operated vehicles may if desired be made in larger sizes for heavier vehicles.

It is simple in construction, easy to attach or detach, is adjustable transversely and can be quickly and conveniently operated.

While I have illustrated and described a preferred form of construction for carrying my invention into effect, this is capable of a wide range of variation, alteration, modification and change without departing from the spirit of my invention, and I therefore do not wish to be limited to the construction herein shown and described, but desire to avail myself of all such variations, alterations, modifications and changes as fairly fall within the scope of the appended claims or may be construed to be within the same by involving the doctrine of equivalents.

What I claim as my invention and desire to secure by Letters Patent is:—

1. An attachment for vehicles comprising a frame, runners, long links pivoting the runners to the frame, slide bars, short links pivoting the bars to the long links, and means for sliding the bars.

2. A sled attachment for vehicles, comprising a frame, runners pivotally linked to said frame, bars slidably suspended beneath the frame, runner links each pivoted at its respective ends to the frame and runner, slide bar links each pivoted to said bar at one end and at the other end to an intermediate point on the runner link, and means for shifting the slide bars.

3. A sled attachment for vehicles, comprising a frame, runners pivotally linked to said frame, bars slidably suspended beneath the frame, runner links each pivoted at its respective ends to the frame and runner, slide bar links each pivoted to said bar at one end and at the other end to an intermediate point on the runner link, and a lever for shifting the slide bars.

4. A sled attachment for vehicles, comprising a frame, runners pivotally linked to said frame, bars slidably suspended beneath the frame, runner links each pivoted at its respective ends to the frame and runner, slide bar links each pivoted to said bar at one end and at the other end to an intermediate point on the runner link, and an angular foot lever for shifting the slide bars.

5. A sled attachment for vehicles, comprising a fixed frame, movable runners, links connecting said runners to the frame, a slide bar operatively connected to the links, a lever, and links connecting the lever to the slide bar.

6. A sled attachment for vehicles, comprising a fixed frame, movable runners, links connecting said runners to the frame, a slide bar operatively connected to the links, a lever, and links connecting the lever to one end of the slide bar.

7. A sled attachment for vehicles, comprising a fixed frame, runners, pivotal links connecting the runners to the frame, slide bars operatively connected to the pivotal links and a lever for sliding said bars.

8. A sled attachment for vehicles, comprising a fixed frame, runners, pivotal links connecting the runners to the frame, slide bars operatively connected to the pivotal links and slidably supported beneath the frame, and means for moving said slide bars to turn the pivotal links.

9. A sled attachment for vehicles, comprising a fixed frame, having means for detachably securing said attachment to the axles of a vehicle, movable runners, links connecting said runners to the frame, a slide bar operatively connected to the links, a lever, and links connecting the lever to the slide bar.

10. A sled attachment for vehicles, comprising a fixed frame having means for detachable engagement with the axles of a vehicle, movable runners, links connecting said runners to the frame, a slide bar operatively connected to the links, and a pivoted lever pivotally connecting the slide bar and passing its pivotable center in shifting the bar to either end of its path of slide.

In testimony whereof I have affixed my signature.

ALLEN D. SANTMIRE.

Copies of this patent may be obtained for five cents each, by addressing the "Commissioner of Patents, Washington, D. C."